(12) United States Patent
Zarecky

(10) Patent No.: US 11,654,599 B2
(45) Date of Patent: May 23, 2023

(54) RECLAIMING AND REMANUFACTURING FIBER REINFORCED POLYMER COMPOSITE STRUCTURES

(71) Applicant: ZED Services LLC, Fishers, IN (US)

(72) Inventor: Joshua George Zarecky, Carmel, IN (US)

(73) Assignee: ZED Services LLC, Fishers, IN (US)

( * ) Notice: Subject to any disclaimer, the term of this patent is extended or adjusted under 35 U.S.C. 154(b) by 187 days.

(21) Appl. No.: 17/331,759

(22) Filed: May 27, 2021

(65) Prior Publication Data

US 2021/0370550 A1    Dec. 2, 2021

Related U.S. Application Data

(60) Provisional application No. 63/031,317, filed on May 28, 2020.

(51) Int. Cl.
| | |
|---|---|
| B29B 17/02 | (2006.01) |
| B29B 17/04 | (2006.01) |
| B29B 17/00 | (2006.01) |
| B29K 63/00 | (2006.01) |
| B29K 105/06 | (2006.01) |
| B29L 31/08 | (2006.01) |
| B29K 105/08 | (2006.01) |

(52) U.S. Cl.
CPC .......... *B29B 17/04* (2013.01); *B29B 17/0042* (2013.01); *B29B 17/02* (2013.01); *B29B 17/0412* (2013.01); *B29B 2017/0021* (2013.01); *B29B 2017/044* (2013.01); *B29B 2017/0448* (2013.01); *B29K 2063/00* (2013.01); *B29K 2105/06* (2013.01); *B29K 2105/08* (2013.01); *B29L 2031/085* (2013.01)

(58) Field of Classification Search
USPC ........................................................ 521/40
See application file for complete search history.

(56) References Cited

U.S. PATENT DOCUMENTS

| | | |
|---|---|---|
| 9,028,731 B2 | 5/2015 | Weyant et al. |
| 10,953,407 B2 | 3/2021 | Lilly et al. |

FOREIGN PATENT DOCUMENTS

| | | | | |
|---|---|---|---|---|
| CN | 106563691 A | * | 4/2017 | ............... B07B 9/00 |
| CN | 111304787 A | * | 6/2020 | ............. D01G 11/00 |
| JP | 2011520004 A | * | 7/2011 | |

OTHER PUBLICATIONS

CN-106563691-A machine translation 2017 (Year: 2019).*
CN-111304787-A machine translation 2020 (Year: 2020).*
JP2011520004A machine translation 2011 (Year: 2011).*

* cited by examiner

*Primary Examiner* — Terressa Boykin
(74) *Attorney, Agent, or Firm* — Kirk A. Wilson; Joseph T. Guy; Patent Filing Specialist Inc.

(57) ABSTRACT

A method of upcycling fiber reinforced polymer source material by disassembling the source material into sections; planking the sections into longitudinal pieces; separating core material from the source material in the longitudinal pieces to make composite strips; preparing the composite strips; and remanufacturing the prepared composite strips into an article.

31 Claims, 15 Drawing Sheets

RECLAIMING AND REMANUFACTURING FIBER REINFORCED POLYMER COMPOSITE STRUCTURES

CROSS-REFERENCE TO RELATED APPLICATIONS

The present invention claims priority to U.S. Provisional Patent Application No. 63/031,317, filed May 28, 2020, incorporated herein by reference in its entirety.

FIELD OF THE DISCLOSURE

The disclosure relates generally to the technical field of recycling and more specifically to the emerging field of upcycling whereby the upcycled product is of greater value than the original waste product. More particularly, the field of upcycling fiber reinforced polymer (FRP) composite structures is disclosed in the context of upcycling wind turbine blades.

BACKGROUND OF THE DISCLOSURE

Wind energy represents a growing percentage of global energy production. The wind turbines, and more specifically relevant to the present disclosure, the wind turbine blades, have a finite service life. At the end of their life wind turbines are decommissioned and their materials recycled or discarded. Wind turbine blades are commonly comprised of glass or other fiber reinforced polymer composites with filler and support materials like foam, wood, metals, and plastics formed into the structure of the blade. Due to the nature of fiber reinforced polymer ("FRP") composites, they are inherently stable meaning they do not readily decompose in landfills or easily break down into homogeneous materials for remanufacturing into virgin materials as in conventional recycling.

There are many companies producing blades for a growing number of wind turbines, and these blades need to be periodically replaced if they wear out or become damaged. This generates a problem for blade manufacturers, utilities, and other entities that may wish to keep decommissioned blades out of landfills. Although the prospect of recycling wind turbine blades may be attractive and consistent with the notion of wind energy as a "green" power source, it has not previously been technically or economically feasible. Despite previous efforts, experts have regarded wind turbine blades as "unrecyclable" and a problematic source of waste.

Current methods of recycling FRP composites utilize energy intensive thermal and/or chemical processes to extract fibers from the polymer matrix or mechanically reduce composites by grinding or other abrasive processes producing a mixture of compounds for further processing and recycling. In some applications new products are formed from pelletized or powdered composites. Alternatively, the polymer matrix is removed, and the remaining glass fibers are used in second generation composite products. These prior art methods of recycling FRP composites degrade the base fiber and structures resulting in a lower quality more expensive process output when compared to virgin fibers utilized in new composite structures.

As a greater portion of commercial and residential power is provided through renewable resources, the supply of used and no longer serviceable wind turbine blades has grown. Therefore, a need exists for methods to recycle the no-longer serviceable wind turbine blades, and other composite objects.

BRIEF DESCRIPTION OF THE DISCLOSURE

The present disclosure provides process and methods for upcycling complex FRP composite structures by reclaiming the FRP composites from the complex structure preserving their intrinsic form without compromising integrity of the fibers in their native polymer composite matrix. The reclaimed sections of FRP composite extracted from a decommissioned wind turbine blade or other composite structure are remanufactured for use in new FRP composite structures.

In one embodiment, a wind turbine blade may be disassembled to reclaim FRP composite materials from the wind turbine blade structure and remanufacture them to create new FRP composite structures. The method of disassembly and remanufacturing does not separate or degrade the fibers in the original polymer matrix leaving it intact maintaining material integrity and capitalizing on the wide range of performance characteristics inherent of FRP composites. The FRP composite materials reclaimed from an end of life composite structure, wind turbine blade, are then remanufactured by laminating or other form of bonding or joining in assembly resulting in an upcycled FRP composite for use in novel applications.

A method of upcycling fiber reinforced polymer source material is disclosed by disassembling the source material into sections; planking the sections into longitudinal pieces; separating core material from the source material in the longitudinal pieces to make composite strips; preparing the composite strips; and remanufacturing the prepared composite strips into a resultant article.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
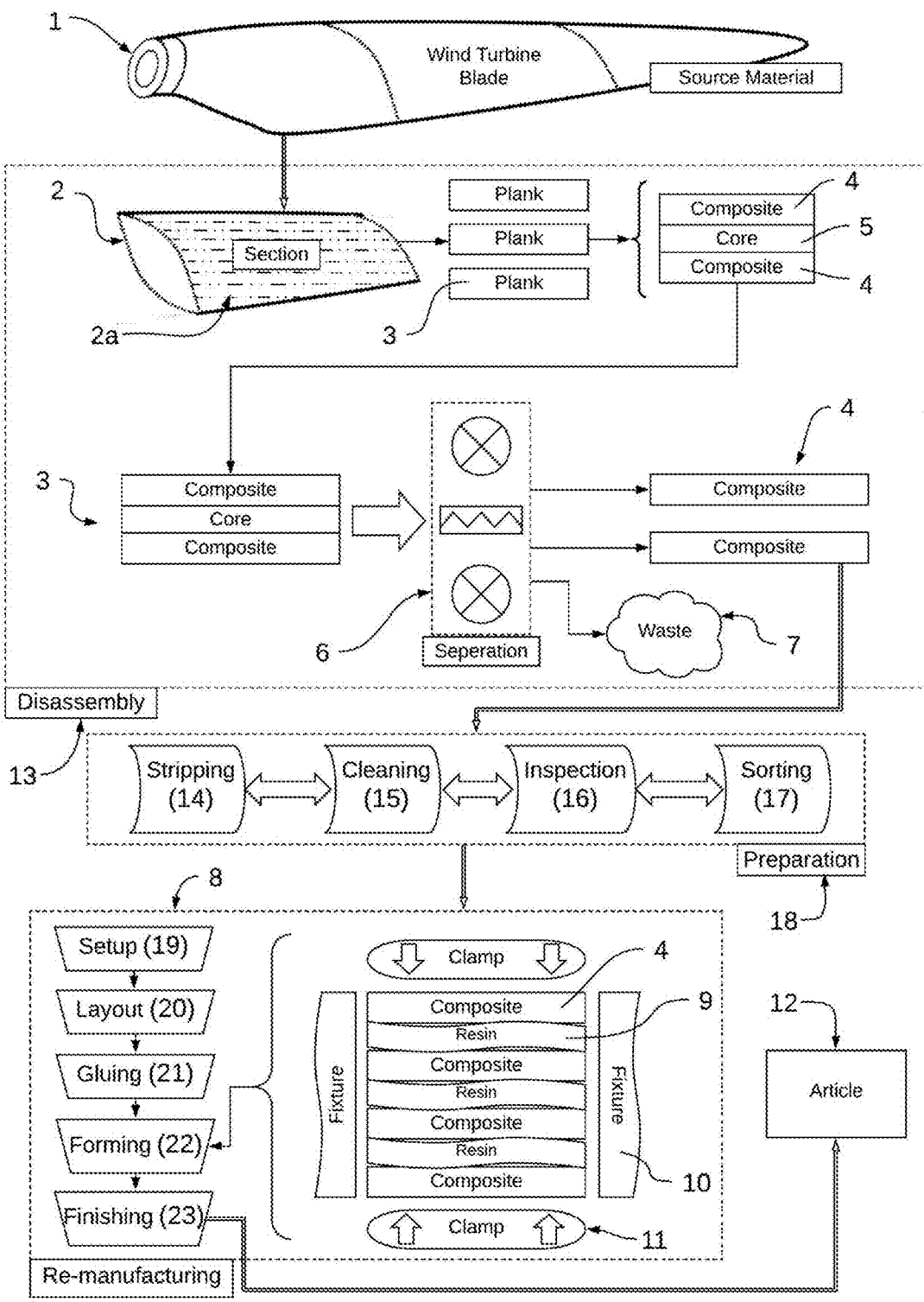
FIG. 1 illustrates a process and method embodiment for reclaiming and remanufacturing fiber reinforced polymer ("FRP") composites in wind turbine blades and complex composite structures.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

The term "proximate" indicates a position on an element that is closest to the vehicle, whereas the term "distal" indicates a position on an element that is furthest away from the vehicle. Dual-headed arrows shown on the figures indicates the ability of a referenced element to change position in a direction generally parallel with the direction of the arrow Detailed descriptions of multiple embodiments are provided herein. The disclosure of the disclosure illustrates best mode embodiments. However, it is to be understood that the application of the present disclosure may be embodied in various forms. Therefore, specific details disclosed herein are not to be interpreted as limiting the scope of the disclosure in any manner, but rather as a basis for claims and as a representative basis for teaching one skilled in the art to employ the present disclosure in virtually any appropriately detailed system, structure, or manner.

References will be made in detail to the embodiments of the disclosure that are illustrated in the accompanying drawings. Identification of like or similar elements and features depicted in the drawings will be referenced using common numerals wherever possible. Drawings are in simplified form and are not intended to depict precise scale. It is to be understood for convenience and clarity that directional terms such as top, bottom, left, right, up down, over, above, below, beneath, rear, front and between may be used in reference to relationships or interfaces depicted within the drawings and are in no way to be construed to limit the scope of the disclosure in any way. Words that depict an interface such as attach, couple, connect and similar terms with the inflectional morphemes refer to their direct relationship or connections via mediate elements or devices. Further, definitions and descriptions of interactions and relationships between elements and processes directly or between intermediaries are not intended to limit the scope of those interactions and in some embodiments some elements may be arranged in alternate sequence, order, or direction of transmittance of an article or process.

Throughout the disclosure "process" refers to the present disclosure or any subdivision of the processes and methods of the present disclosure. Common morphemes including processes, processing, processed, methods, etc. all refer to process or the process outputs. Terms are identified in association with their use in the disclosure and drawings. The numeric index directly reflects the numeral used to identify the features within the disclosure's detailed design description and associated drawings.

| | |
|---|---|
| 1. | Source Material |
| 2. | Section |
| | a. Cut lines |
| 3. | Planks |
| 4. | Composite |
| 5. | Core |
| 6. | Disassembly |
| 7. | Waste |
| 8. | Remanufacturing |
| 9. | Resin |
| 10. | Fixture |
| 11. | Clamp |
| 12. | Article (output of process) |
| 13. | Disassembly |
| 14. | Stripping |
| 15. | Cleaning |
| 16. | Inspection |
| 17. | Sorting |
| 18. | Preparation |
| 19. | Setup |
| 20. | Layout |
| 21. | Gluing |
| 22. | Forming |
| 23. | Finishing |

Referring now to the drawings and detailed embodiments, FIG. 1 illustrates the fundamental processes and methods for reclaiming and remanufacturing fiber reinforced polymer ("FRP") composites in wind turbine blades and complex composite structures, henceforth referred to as ("process"), of the present disclosure. The reclaimed and remanufactured FRP composite, henceforth referred to as "composite" and is inclusive of all forms of composite or FRP composite within the source material 1. The fiber in FRP refers to any and all reinforcing fibers utilized in fiber reinforced composites including but not limited to glass, a polyaramid synthetic fiber such as Kevlar, and carbon fibers. The polymer refers to any polymeric epoxy or other thermoset matrix commonly used in the manufacture of wind turbine blade and complex composite structures.

The process begins with a source material 1 illustrated throughout this disclosure as a wind turbine blade. The source material 1 can take many forms including but not limited to a wind turbine blade, a boat hull, automotive components and commercial or industrial structures, generally characterized as large and/or complex structure with variable geometries and composition/distribution of materials including but not limited to FRP composites, foam, wood, metal, plastic, fabric, and various adhesives/epoxies combined in the original construction of the structure without the intention or presumption of disassembly. These complex composite structures, as exemplified by the wind turbine blade of one embodiment, are engineered for performance under demanding environmental and loading conditions over a long service life. When the source material 1 reaches the end of life it is decommissioned and either recycled or sent to a land fill. Conventional waste management methodologies do not have a means of disposal of these complex composite structures beyond the landfill or cumbersome and cost prohibitive recycling methods requiring significant chemical, thermal, and/or electrical energy. The recycling methods of the existing art focus on reclaiming the fibers in the fiber reinforced polymers from the composite matrix and all other materials are consumed or otherwise discarded. Reclaiming the fibers for use in new manufacturing applications requires breaking down the composite structure and the polymer matrix the fibers are within resulting in a collection of fibers of diminished quality and mechanical characteristics suitable for lower performance secondary applications than the new virgin fibers utilized in the original fabrication of the source material 1. These conventional recycling methods have seen limited successful industrial scale implementation due to the increased cost and diminished performance with respect to virgin glass or carbon fibers utilized in new FRP composites.

In contrast, the process of the present disclosure reclaims composite 4 strips from the structure of the source material 1 retaining the inherent physical form and performance characteristics of the composite 4. The reclaimed composite 4 strips are remanufactured 8 for use in various applications. Remanufacturing 8 comprises the combination of a plurality of composite 4 pieces to produce an article 12, the output of the process of the present disclosure, which capitalizes on the strengths of the native composite 4 from the source material 1 without the negatives associated with pulverizing the blades for bulk molding or reclaiming the fibers from the FRP composite matrix of the source material 1 using conventional recycling methods of the existing art. The characteristics of the resultant article can be influenced by the characteristics of the reclaimed composite strips from the source material. The resultant article can then take its form from the fixture/clamp of the remanufacturing process.

The process of the present disclosure depicted in FIG. 1 comprises the physical disassembly 13 of the source material 1 into predefined appropriately sized sections 2 for economical handling and optimized processing and subsequent cutting of the sections 2 into planks 3 along predefined cut lines 2a ideally oriented to maximize length and minimize curvature of the resulting planks 3. Cut lines for the sections 2 and planks 3 can be predefined, for example, by image processing a 3D scan of the source material 1 or by using 3D drawings of the source material 1 to optimize cut line locations for the desired plank geometry and fiber orientation. In the exemplary embodiment of a wind turbine blade, source material 1, the planks are generally characterized by a cross section comprising composite 4 skins on the interior and exterior surfaces of the of the source material 1 with a core 5, commonly foam or wood, between to provide structure for the form of the source material 1. The planks 3 are further disassembled through the separation 6 process by mechanically breaking the interfaces between the composite 4 and the core 5. The composite 4 strips are retained for remanufacturing 8 while the core 5 material and additional by-products not suitable for remanufacturing 8 are introduced into the waste 7 stream for conventional recycling where applicable or disposal. The reclaimed composite 4 strips undergo a series of preparation 18 steps prior to remanufacturing 8.

In one embodiment illustrated in FIG. 1 the composite(s) 4 extracted from the source material 1 undergo a number or preparation 18 activities including but not limited to stripping 14, cleaning 15, inspection 16 and/or sorting 17 as applicable. These activities which independently or all together comprise the preparation 18 of reclaimed composites 4 prior to remanufacturing 8 and may be executed in any order serially or in parallel according to the materials, methods and desired process outputs. Stripping 14 is the process of removing any residual core material, construction adhesives, coatings, or foreign materials remaining bonded to the surfaces of the reclaimed composite 4 after the rough separation 6 process. Cleaning 15 removes all dust, grease, oils, and residue from the reclaimed composite 4 so all surfaces are clean prior to remanufacturing 8. All reclaimed composite(s) 4 and additional materials to be utilized in remanufacturing undergo inspection 16 to ascertain and/or verify the condition, configuration, and/or key characteristics of the composite 4 to be remanufactured 8. The reclaimed composites 4 are further sorted 17 based on their condition, configuration, physical, dimensional and performance characteristics according to the intended article 12 to be produced by the remanufacturing 8 process.

A collection of reclaimed composites 4 suitable for the intended article 12 to be produced are introduced to the remanufacturing 8 process. Remanufacturing 8 begins with the setup 19 of all tools and equipment including associated fixture(s) 10 and/or clamp(s) 11 required to produce a desired article 12. Each article 12 may be comprised of an innumerable combination of composite 4 pieces and relative orientations or layout(s) 20 each potentially requiring unique fixture(s) 10 and/or clamp(s) 11 to generate the desired form of the article 12. A fixture 10 provides a control for the layout 20 of composite 4 pieces to be remanufactured 8 into an article 12. The layout 20 requires gluing 21, the application of a resin or other adhesive between layers of composite 4, within or prior to positioning within the fixture 10 such that their arrangement is fully retained within the fixture 10. Forming 22 is the transformation of a complete layout 20 with gluing 21 securely held by clamps 11, which apply a constant or variable holding pressure for sufficient time such that the resulting article 12 retains the prescribed form of the fixture 10 with physical, chemical, thermal, and electrical performance characteristics of the composite 4 and resin 9 utilized. In some embodiments as illustrated herein the clamp 11 may also serve as a form 10. The resulting article 12 may undergo finishing 23 to trim, clean, polish, machine, or further remanufacture 8 the article 12 ultimately generated as a finished product and the output of the process and methods of the present disclosure for reclaiming and remanufacture composites utilized in wind turbine blades and complex composite structures for various applications.

Some examples of applications and representative products which the article 12 generated by the processes of the present disclosure include but are not limited to structural beams, panels, walls, roofs, and lattice structures.

Figure 3:
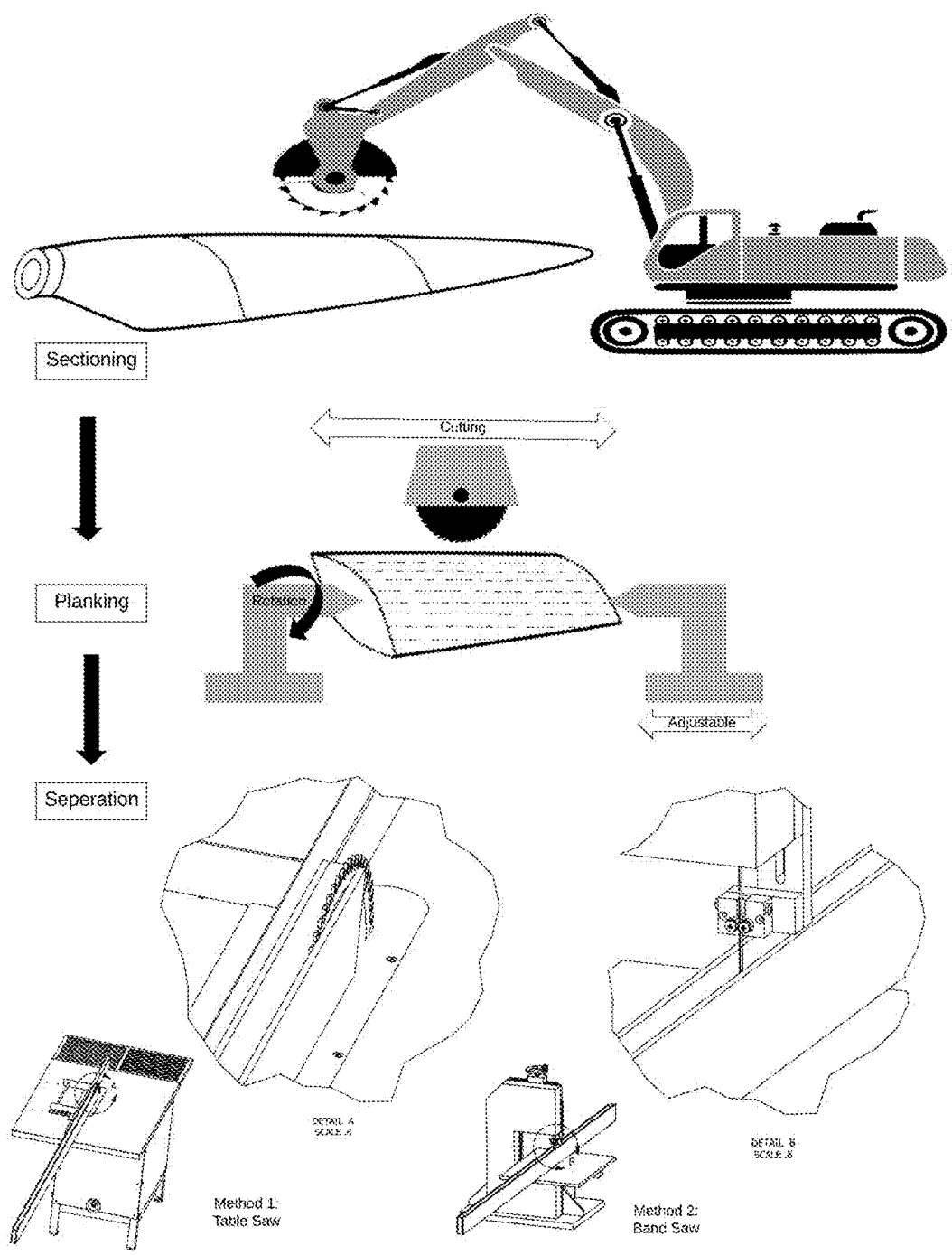
FIG. 3 illustrates different techniques for disassembly such as sectioning, planking, and separation.

The reduction of the source material 1 into sections 2 and subsequently into planks 3 as illustrated in FIG. 1 is accomplished by cutting the source material 1 utilizing circular, reciprocating, band or other suitable sawing method for the material type and size of the source material 1. Cutting methods cover a range of options from manual operations using handheld tools to large saws mounted on the end of an excavator or other industrial equipment with multi-axis articulating control to accommodate the physical characteristics of the source material 1. The apparatus and associated tooling may constitute a multitude of configurations with variables including but not limited to the type of blade and method of cutting in order to most efficiently cut the source material 1 into sections 2 and planks 3. Cutting as described may utilize liquid, air, or other cooling and lubrication to improve cutting quality and efficiency. There are a multitude commercially available cutting apparatus suitable to the demands of the application described herein and may be employed in the most advantageous configuration for the source material 1. Illustrations of sectioning and planking cutting apparatuses are shown in FIG. 3, however, practically any manual or automatic tools can be used for cutting the source material 1 that fit the cutting duty and form factor of the source material 1. Alternative non-mechanical cutting methods may also be utilized to cut the source material 1 into sections 2 and planks 3 including water jet and/or laser machines.

The planks 3 produced by cutting sections 2 of source materials 1 along cut lines 2a are significantly longer than they are wide with variable thickness inherent to the source material 1 structure. Common planks 3 are between 3 inches and 24 inches wide and the greatest possible length which maximizes the plank 3 size while minimizing the surface curvature of the plank 3, usually greater than 8 feet long. The structure of the wind turbine blade, source material 1, is characterized as a complex surface with areas of significant curvature (small bend radius) and large spans with minimal curvature (large bend radius approaching flat). The sectioning 2 and subsequent planking 3 operations are ideally optimized such that the maximum contiguous approximately flat surface area of composite 4 is retained within the plank 3 to be separated 6 from the core 5 in the next step of disassembly 13.

Continuing in reference to FIG. 1 the separation 6 phase of disassembly 13 is disclosed whereby the planks 3 are mechanically or by other abrasive methods divided along the interface(s) between the composite 4 skins located on one or both sides of a core 5 material within the structure of a plank 3. The separation 6 of composite 4 from the core 5 material of each plank 3 can be achieved by a multitude of cutting technologies using commercially available equipment without modification or custom apparatuses developed for the efficient and controlled separation 6. The variation of the thickness of the composite 4 and core 5 material as well as type of core 5 material necessitates a flexible selectively variable separation 6 apparatus. Some common apparatuses suitable to this application include a table saws, band saws, reciprocating saws, and oscillating cutters which accommodate cutting a fixed selectable offset from a reference surface over a long distance. In some embodiments the cutting offset from a reference surface, the outside surface of a plank 3, is adjustable manually or automatically via automation and computer controls to precisely cut along the interface between the composite 4 and core 5. Further, in some embodiments a plurality of cutters and/or cutting apparatuses are utilized simultaneously or sequentially to separate 6 more than one composite 4 from the core 5 in one operation versus multiple operations to remove each side of composite 4 from the core 5 of each plank 3. In all embodiments it is the intention that cutting of composite 4 from the core 5 of each plank 3 during separation 6 is executed such that the core 5 is the primary material being cut, not the composite 6. By cutting the core 5 only the maximum of composite 4 can be reclaimed without damage while minimizing tool wear and maximizing processing time. The output of the upcycling process is a structural article 12 comprising adhered layers of fiber reinforced polymer composite strips as illustrated in FIG. 1.

Figure 2:
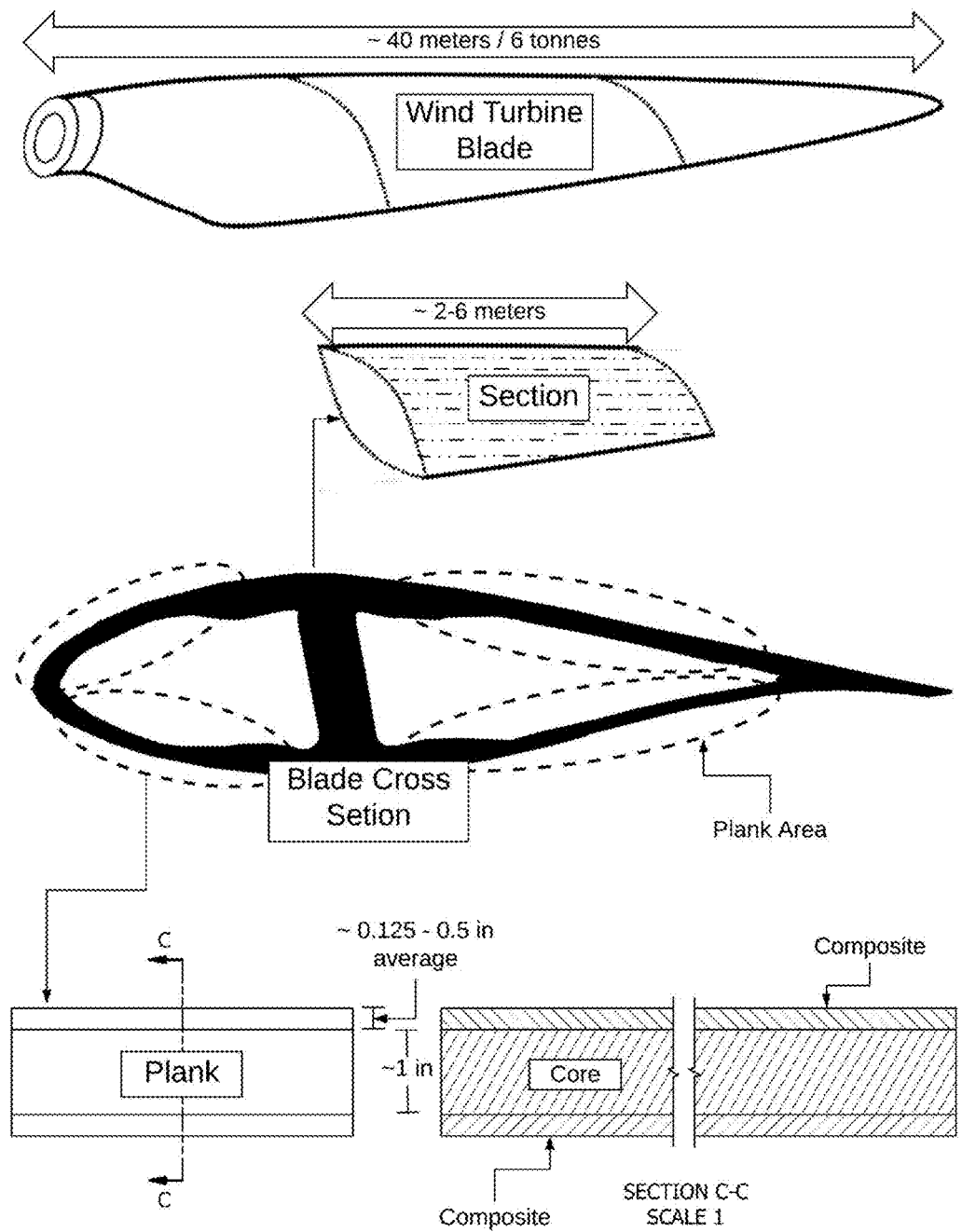
FIG. 2 illustrates the base material characteristics for a typical wind turbine blade.

The source material illustrated in its exemplary embodiment shown in FIG. 2 is a wind turbine blade. The cross section of the blade is comprised itself of two halves with one or more load bearing members running the length of the blade as shown in FIG. 2. The halves are comprised of layers of fiber reinforced polymer (FRP) composite and various supporting materials referred to as the core including but not limited to foam, wood, metals, plastics, adhesives, and coatings. The planks cut from the source material sections are characterized by the composite sandwiching the core material. The layers of the blade must be separated into homogenous materials to isolate the FRP composite strips. The FRP composite strips constitute the base material to be remanufactured to form the new upcycled structural fiber reinforced composite members of this disclosure.

Separation of homogenous materials, as seen in FIG. 1, is a process by which the strips of wind turbine blade are disassembled to remove the supporting materials from the FRP layers. Separation may be accomplished by mechanical, chemical, or thermal methods as appropriate for the target supporting material. Methods of disassembly can be by mechanical means, as seen in FIG. 3, including, but not limited to cutting, grinding, scraping, sanding, and machining. The separation of the planks utilizing methods illustrated in FIG. 3 divides the FRP strips from the core material of the planks by breaking the interfaces between the FRP and core materials.

The strips of fiber reinforced polymer composite material harvested from the composite structure of the wind turbine blade may be of a multitude of configurations which must be identified. Common configurations include uniaxial, biaxial, and triaxial referring to the number and orientation of the reinforcing fibers of the FRP composite. Composite structures utilize the fiber orientation to maximize the tensile strength and stiffness of the structure in the direction of the length of the fiber. For applications where loading may be imparted in multiple directions the fiber configuration and orientation is designed to accommodate the expected loading. Identification of the fiber orientation in the FRP strips is used to design and optimize the structural members produced by the execution of the process detailed in this disclosure.

Figure 4:
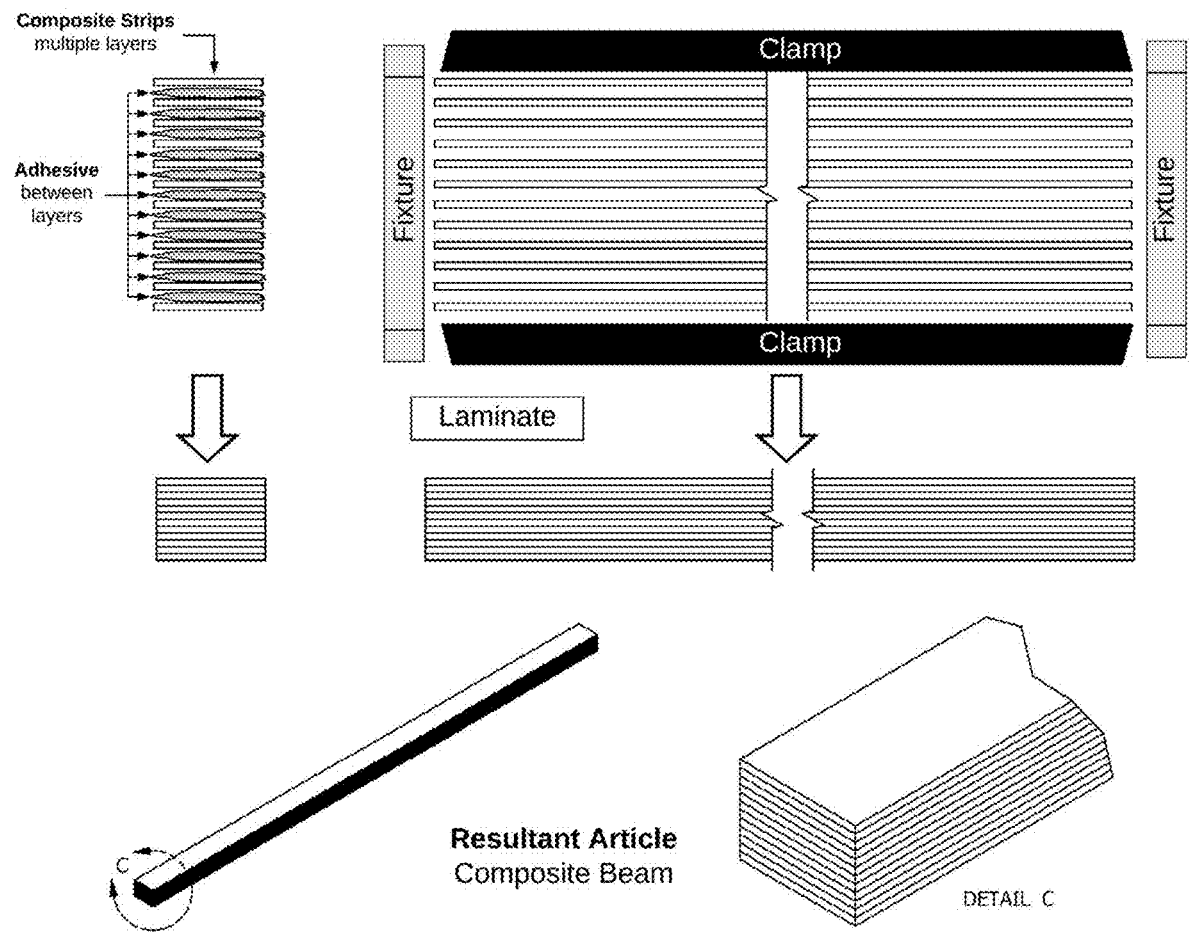
FIG. 4 illustrates a typical upcycled resultant article, composite beam.

Referring now to FIG. 4 a basic article illustrated as a beam is shown in the remanufacturing setup to form the resultant beam. Reclaimed FRP composite strips are stacked with adhesive between layers and positioned within a fixture between clamps. The fixture holds the form of the beam while the clamps apply pressure to compress the layers and hold during curing of the adhesives. Once cured the clamp is removed and the remanufactured composite beam is removed from the fixture then further processed and/or finished for the intended use application.

Figure 5:
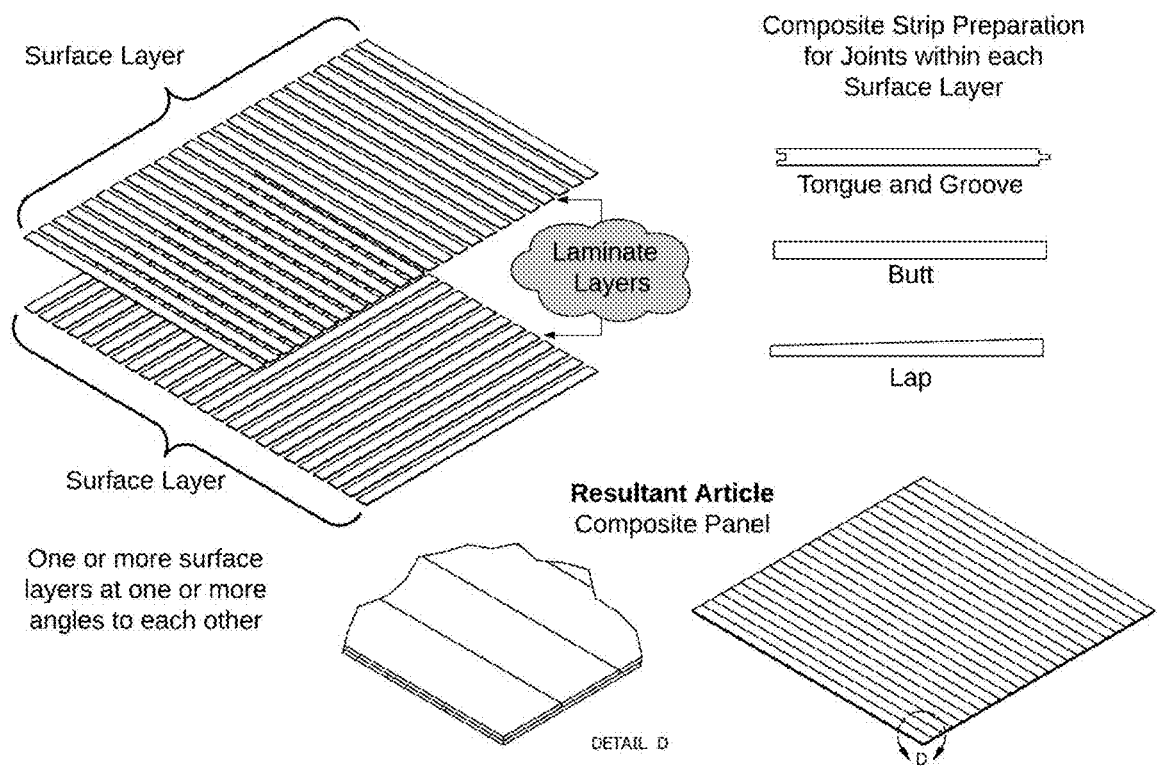
FIG. 5 illustrates a typical upcycled composite panel.

Referring now to FIG. 5 an alternative resultant article illustrated and referred to as a composite panel is shown. A composite panel is comprised of a number of reclaimed composite strips aligned sided by side and laminated perpendicular to one more layer(s) of similarly aligned reclaimed composite strips. The remanufactured composite strips used to assemble a composite panel produce a large flat surface with thickness determined by the thickness of the reclaimed composite strips used and the number of layers. The length and width of a given composite panel is a function of the length of the reclaimed composite stripes used to produce the panel. The resultant article, a composite panel, as illustrated in FIG. 5 has the added benefit of capitalizing on the fiber orientation of the reclaimed strips on all directions the strips are used in to produce the article inherently yielding a stiff panel suitable for loading in multiple directions. The preparation step may also modify strips to add necessary features for the article to be made.

Examples include tongue and groove joints, lap joints, butt joints, and scarf joints as shown in FIG. 5.

Figure 6:
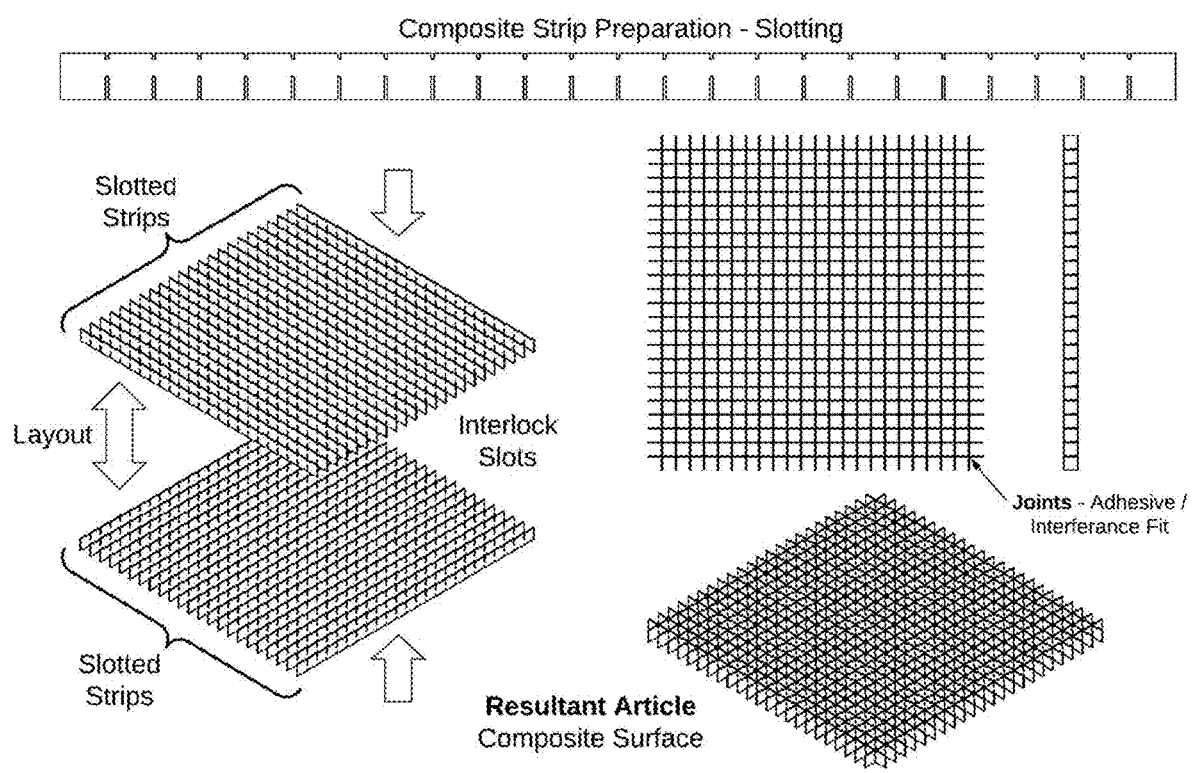
FIG. 6 illustrates a typical upcycled composite surface.

FIG. 6 shows a composite strip which has been modified as a part of preparation to have slots. FIG. 6 also illustrates an arrangement of 2 layers of slotted strips oriented 90 degrees, or perpendicular to each other, such that the slots interlock to make a surface for an article. The orientation and configuration of the slot can be configured to facilitate custom surface profiles including non-planar surfaces. The composite surface illustrated in FIG. 6 benefits from the strength and stiffness of the reclaimed composite strips while minimizing weight of the surface.

Figure 7:
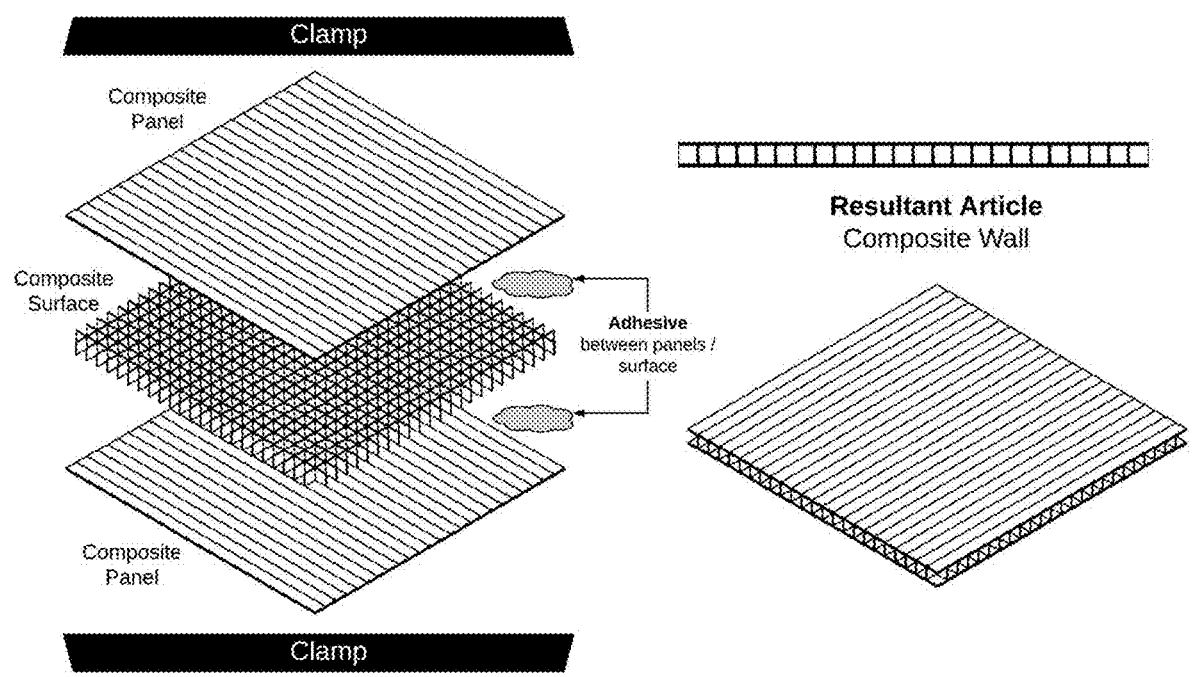
FIG. 7 illustrates a typical upcycles composite wall.

Referring now to FIG. 7 a composite wall is illustrated as the combination of a composite surface with one or more composite panels. The composite wall is a resultant article comprised of reclaimed composite strips remanufactured to product a structurally reinforced assembly with solid external surfaces (panels) and a honeycomb like inner structure (surface). The composite wall has many suitable applications from building construction, protective structures, configurable installations, and/or specialty applications. In some embodiments the internal cavities of the composite surface between external composite panel within a composite wall may be filled with insulation or other materials to further enhance or customize the characteristics of the wall depending on the intended use application and environment.

Prior to laminating surface preparations are conducted in accordance with the needs of each FRP strip. Possible preparation processes include planning thickness, surface roughing, filling voids and trimming edges. Preparation processes standardize the geometry through the layers of the laminated composite structure and improve adhesion between layers.

The process of upcycling fiber reinforced composites as detailed is most characterized by the laminating phase of the process. Laminating is the bonding of multiple layers of fiber reinforced polymer composite harvested from the wind turbine blade to form a new solid composite material structure. The new composite structure of this disclosure is a structural member with performance and load bearing characteristics influenced by the fiber orientation, layer thicknesses, number or layers, laminating compound characteristics, and form factor of the resulting structural member.

Example Process and Methods: An example source material can be a decommissioned (end of life) wind turbine blade (see FIG. 2) with an average 40 meter length and 6 tons weight. Alternative source materials include boat hulls, recreational vehicle (RV) bodies, and other simple and complex composite structures. FIG. 3 illustrates some of the disassembly steps that breaks down the source material into base materials using sectioning and separation. Source material is cut into manageable sections using tools such as a horizontal band saw, masonry, tile, rock, and/or circular saw of suitable type and size for the source material. Additionally, manually using handheld saws or a stationary saw in which the material is loaded onto for cutting is anticipated. A large saw on the end of an excavator or other multi-axis articulating arm, waterjet, and laser cutters are additional tools for sectioning.

Planking involves cutting sections into longitudinal pieces using at least one of a vertical band saw to cut loaded material section along its length, a circular saw on the end of an excavator or other multi-axis articulating arm, a reciprocating saw, and table saw. Similarly to sectioning the planking can also be accomplished by means of water jet, laser cutters, or more complex cutting apparatuses which may have more than one cutting head to make multiple cut thereby producing more than one plank at a time.

Separation involves mechanically separating the core material of each plank by cutting lengthwise between the composite skin and core material of the plank to remove the composite from the core on one or both sides of the blank as applicable using such tools as a circular saw, band saw and reciprocating/oscillating cutter.

Preparation involves processing of the extracted sections of fiber reinforced polymer (FRP) composite strips prior to remanufacturing. Stripping removes all residual material from core and protective coatings from all surfaces of the FRP composite strips using at least one of mechanical grinding/scraping, chemical solvents to dissolve coating and residual materials or etch surface to aid in stripping, and thermal removal to burn or heat the surface to remove impurities and residual materials. Cleaning removes all dust, grease, and any remaining residual surface contaminants from the composite strips. Inspection examines the FRP composite strips for cracks, damage, and imperfections which would inhibit or degrade the end product using at least one of visual inspection, X-ray inspection, and fluorescent dye inspection. Sorting classifies and co-locates similar FRP strips based on key characteristics such as fiber orientation (uniaxial, biaxial, multi-axial), fiber density, thickness, condition (discard material with excessive damage) and width. Preparation can also include modifications as shown in FIGS. 5 and 6, including machining or other physical process not identified in FIG. 1 but are common and sometimes critical element of preparation.

Remanufacturing involves construction of novel composite structures from reclaimed FRP composite materials as described above. Remanufacturing can include: setup, wherein configuration of tooling and fixtures suitable for the composite structure to be constructed is determined; layout, wherein configuration of reclaimed FRP composites in the orientation(s) necessary for each layer of the composite structure to be constructed are determined; gluing, wherein application of glue, resin, or suitable adhesive to all mating surfaces of the composite structure to be constructed is applied. The glue, resin, or adhesive used is dependent on the desired performance characteristics of the composite structure to be constructed; forming, wherein the article is clamped and held within a fixture having a combination of reclaimed FRP composites and adhesives under suitable pressure, temperature, and duration for curing. Heat and/or UV light may aid curing in some embodiments. Vacuum may aid in curing and performance but removing trapped air in some embodiments; finishing, to clean, cut, and polish as appropriate the remanufactured composite structure.

Final configurations include composite structures such as a beam with laminated composite layers (FIG. 4), large beams comprised of laminated or mechanically attached laminated beams with a variety of cross sectional beam profiles (FIG. 13), panels having laminated woven or crossed layers of composite producing a large planar surface or panel (FIG. 5), interlaced products having cut and assembled composite strips interlocked producing a triangular or other geometric tessellated pattern (FIG. 6), formed structures of laminated layers fixed and cured in a non-planar configuration producing a formed composite surfaces (FIG. 7).

Figure 8:
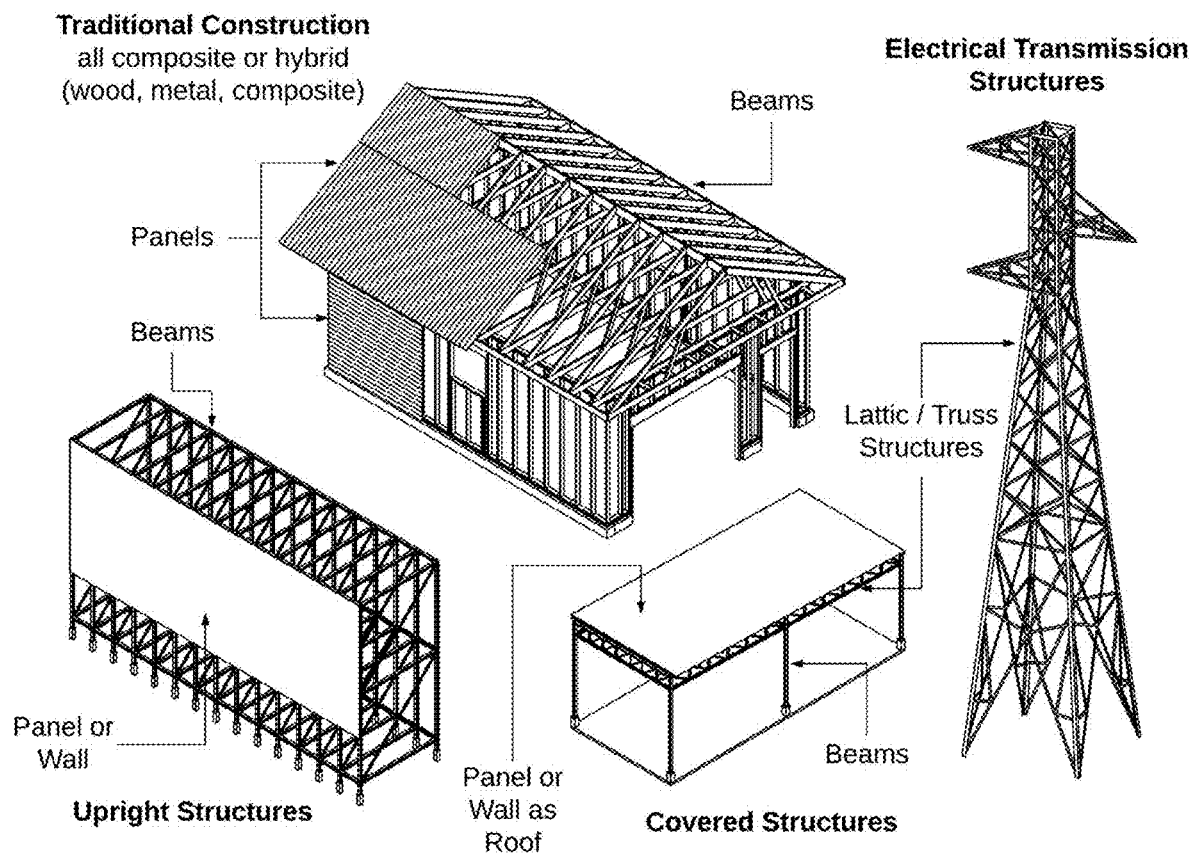
FIG. 8 illustrates some typical upcycled composite construction assemblies.

Examples of structural assemblies of upcycled products are illustrated in FIG. 8. Possible applications and uses for upcycled FRP composite beams and remanufactured products include lattices and trusses, structural support beams, interlocking structures, upright and covered structures and whole buildings. Some additional applications not illustrated in FIG. 8 include concrete forms having core structure with laminate surfaces, ballistics applications like bullet and shrapnel protection including using plates for smaller protective applications such as bullet proof vests and apparel. Also, commercial and industrial device damage protection such as panels for wall or another large surface shielding of buildings and vehicles.

Figure 9:
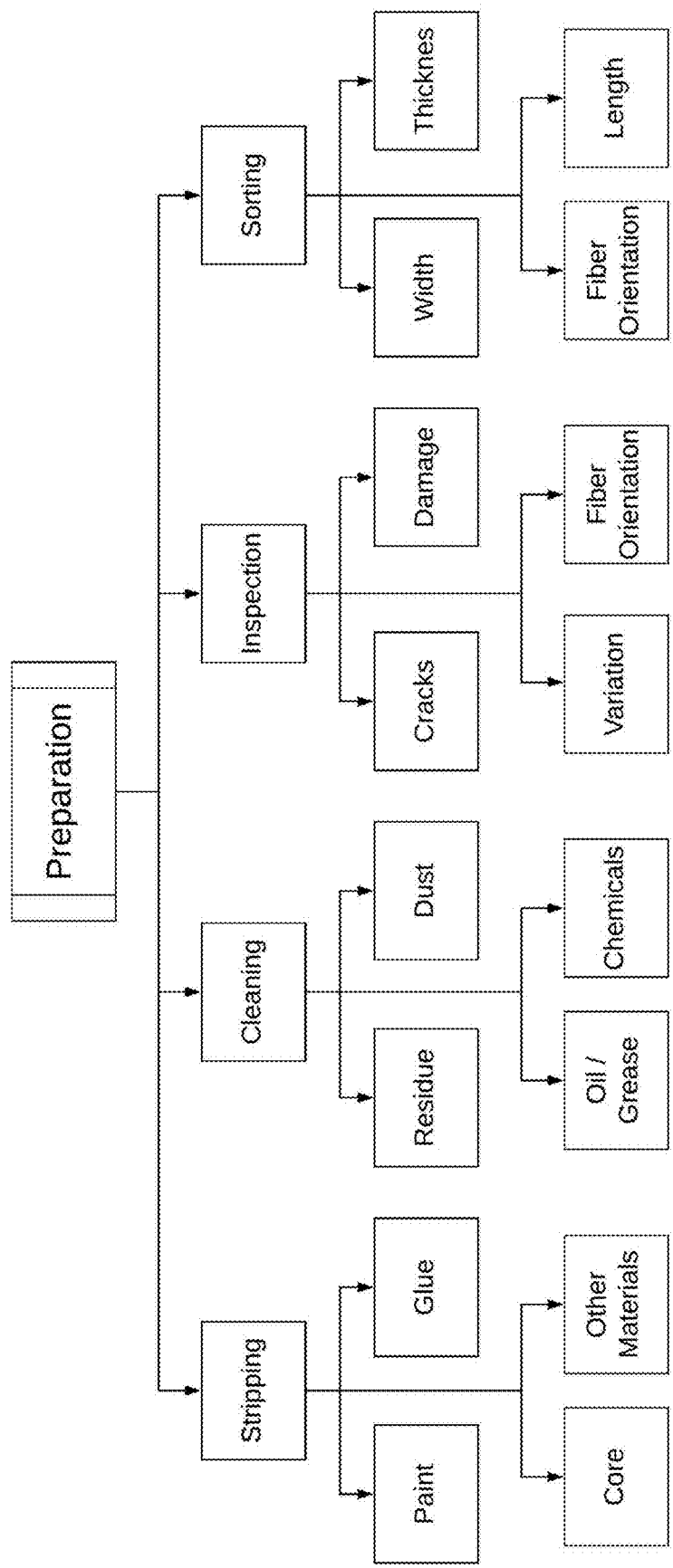
FIG. 9 illustrates a flow chart of the key steps and factors in the preparation process step.

FIG. 9 illustrates some key preparation process steps. Not all steps will always be necessary and others certainly exist. Stripping is the act of removing all excess materials and compounds attached to the FRPC (Fiber Reinforced Polymer Component) prior to remanufacturing. Paint on external surface is scrapped, dissolved, ground off or otherwise removed. Glue from assembly of the blade which is not a part of the fiber reinforced polymer composite matrix is removed. Excess core material not removed during the separation process is also removed. Other materials like metals, wood, or other foreign materials present which are not the FRPC are removed and conventionally recycled where possible or otherwise discarded as waste. Stripping when necessary is essential to the quality of the resultant article to be produced by the process of the present disclosure.

Cleaning is the act of removing all foreign substances on the surface of the FRPC strips once all stripping and other material removal activities are complete, such as residue from other materials, dust from the disassembly processes, oil and/or grease which may be present from cutting tools or the material removal process, and chemicals used during the manufacture and/or disassembly of the wind turbine blade. Cleaning ensures that FRPC strips utilized in the remanufacturing process are in the best possible condition to form robust bonds to adjacent FRPC layers in the laminating process to produce a robust and durable resultant article utilizing the process of the present disclosure.

The inspection step can include inspecting the reclaimed materials for defects, damage or other issues which could impact the resultant article. Inspection can be manual or automated using visual, x-ray, chemical penetration or other inspection methods. Cracks in the fiber reinforced polymer composite strips can be detected, as well as damage of the fibers within the polymer matrix, fiber orientation(s) of each reclaimed composite strip, and variation in the orientation size or other characteristics of the reclaimed material. Inspection data feeds into the sorting step and can help determine the best use(s) and ideal orientations for each reclaimed FRPC in order to optimize their end use condition within a resultant article.

The sorting step can include sorting of the stripped, cleaned, and inspected reclaimed FRPC strips based on their fiber orientation(s) and dimensional characteristics, or other key variables, depending on the application and form of the resultant article to be remanufactured.

Figure 10:
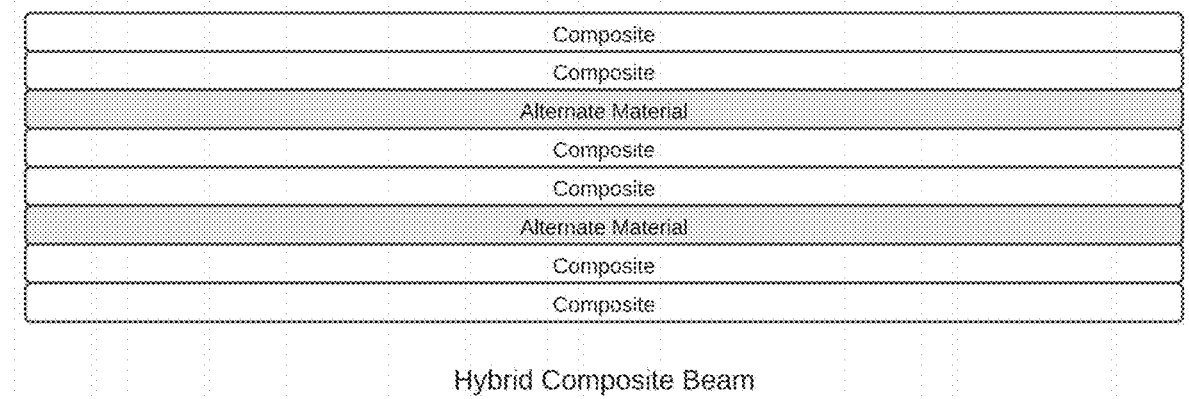
FIG. 10 illustrates a beam characterized by a number of joined layers with some non-composite layers included.

FIG. 10 illustrates a hybrid composite beam as a layered laminated beam with alternating or intermittent layers of a non-composite material added to the final beam structure. Example materials can be wood, or metal like aluminium or steel. An additive material layer can be included to alter the resultant beam characteristics for stiffness, strength, flexibility, weight, etc. Alternate materials included on the exterior surface of a resultant article and provide surface protection for the FRPC within and further enhance strength and durability of the resultant article in some use environments. Alternate materials on all or a portion of the external surface of a resultant article (i.e. washers) can enhanced mechanical joining using fasteners or other methods which may introduce localize stress concentration on the fibers within the FRPC which could lead to premature damage and performance degradation.

Figure 11:
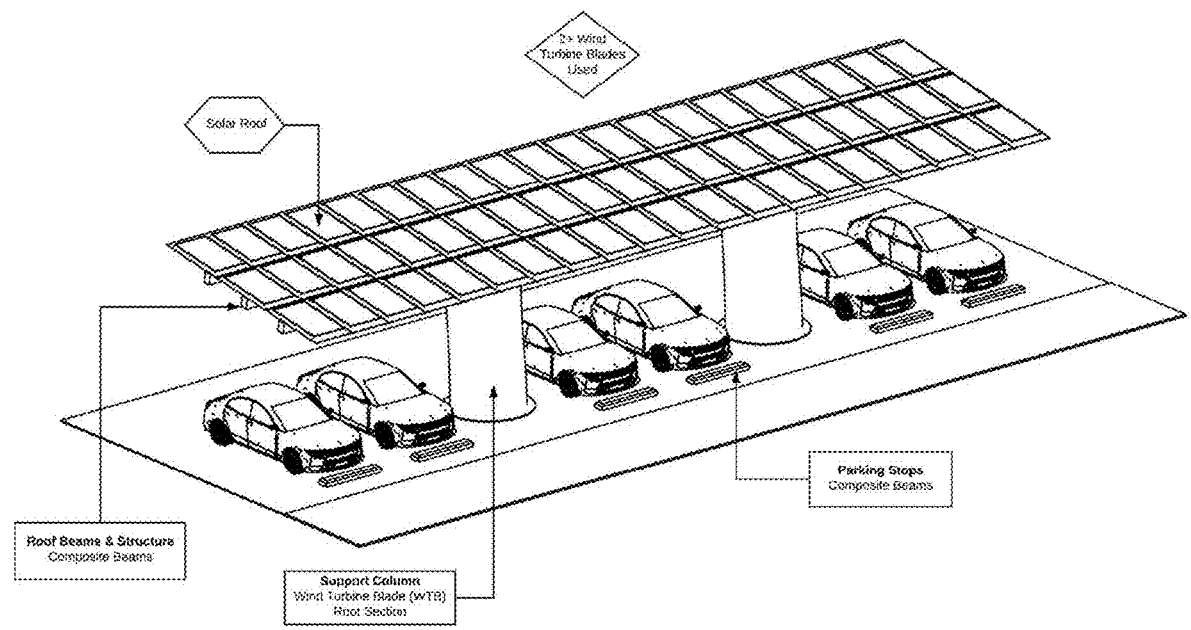
FIG. 11 illustrates a perspective view of a concept parking structure constructed of partial wind turbine blade sections and remanufactured composite beams.

FIG. 11 illustrates a parking structure application that can be constructed using reclaimed composites and remanufactured beams from end-of-life wind turbine blades. A structure support column can be implemented using a whole intact root section of a wind turbine blade. The column may be a standalone section or filled with concrete or other reinforcement. The column also can be composite beams in lieu of the root section. The main and secondary roof structures can be constructed using composite beams and or panels. The roof may be covered with solar panels. The parking stops may be composite beams or intact wind turbine blade pieces. This illustrates one application where the entirety of the application and installed structures which currently utilize conventional construction materials and techniques could be fully replaced with upcycled end of life fiber reinforced composites from end of life wind turbine blades. Similarly one exemplary application for the composite beams produced via the process of the present disclosure is the physical structures supporting solar panels in wind farms.

Figure 12:
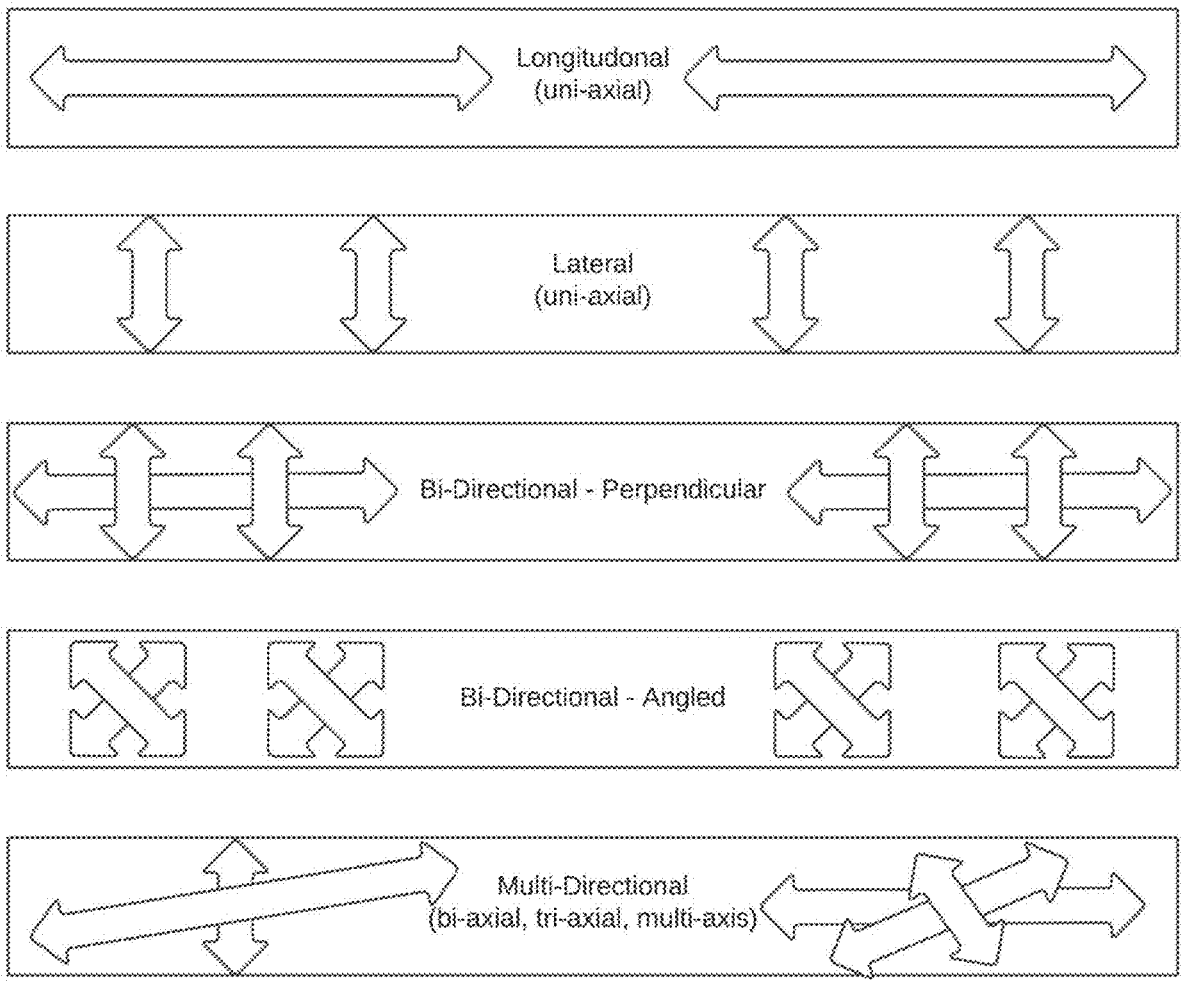
FIG. 12 illustrates a representative configurations of the composite fiber orientations within a fiber reinforced polymer composite matrix.

FIG. 12 illustrates representative configurations of the composite fiber orientations within the fiber reinforced polymer composite matrix. The fibers which are embedded into the thermoset polymer matrix of a wind turbine blade can be long stranded, often continuous fibers arranged in a number of possible configurations for various structural and design reasons. The reclaimed planks of fiber reinforced polymer composites will have the characteristic fibers running in one or more orientations with respect to the length of the plank. Longitudinal fibers run lengthwise with the plank and represents the ideal orientation for uni-directional fibers to maximize the value of the reclaimed material and the resultant remanufactured composite structures. Lateral fibers can run perpendicular to the length of the composite section from side to side and is the least preferred orientation for most remanufactured applications because the load over the length of the section is only supported by the polymer matrix and not the fiber. Bi-directional perpendicular fibers have two characteristic fiber directions running across each other perpendicularly with fibers running longitudinally and laterally. Bi-directional angled fibers have two characteristic fiber directions running across each other at an angle with respect to the fiber reinforced composite plank section and maybe me at a multitude of respective angles to each other. The bi-directional fibers may be layered, interlaced, woven, alternating or other relative positional with respect to each other aside from their strand orientation. Some instances may have two or more characteristic fiber directions known as multi-directional fibers. The number of fiber directions and their orientation is the result of the design of the base composite structure to be reclaimed and re-manufactured as well as the performance characteristics of any new composite products constructed using the reclaimed materials. The fiber orientation of the reclaimed FRPC can be used to tailor the performance characteristics of the remanufactured composite article.

Figure 13:
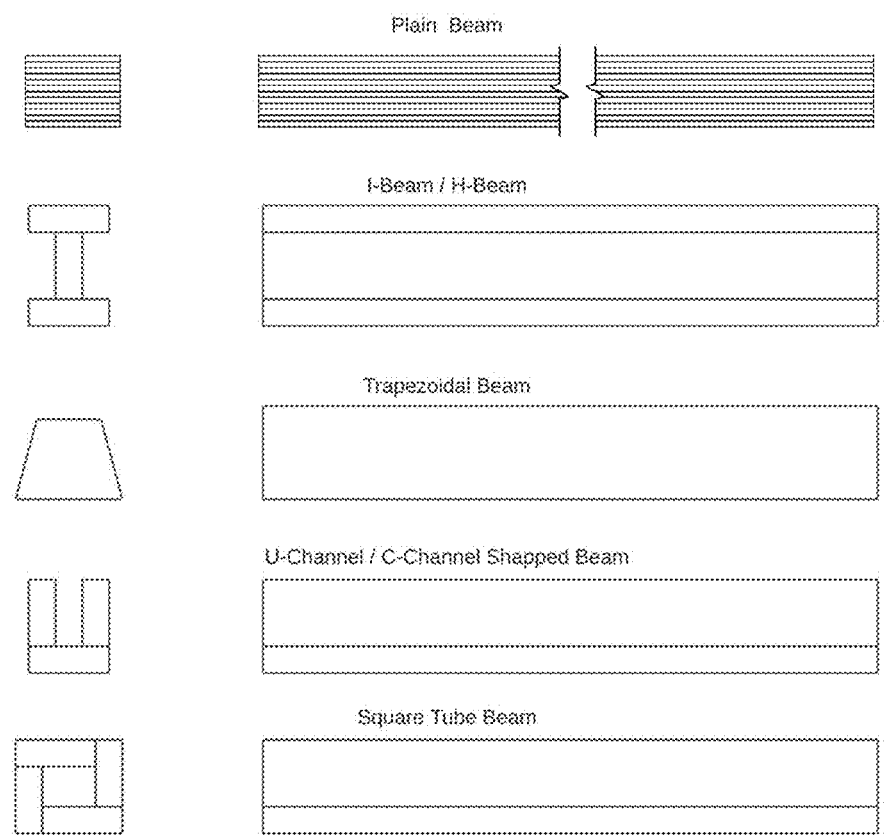
FIG. 13 illustrates a representation of common beam profiles formed from reclaimed fibers.

FIG. 13 illustrates example remanufactured composite beam profiles. Traditional plain beam with a square or rectangular profile constructed from several layers of reclaimed fiber reinforced polymer composite material. I-Beam or H-Beam constructed by one of the following methods; 1) variable width layers of fiber reinforced polymer composite material to form the desired profile, 2) multiple plain composite beams assembled to form the desired profile, or 3) plain beam finish cut to make the desired profile. A trapezoidal beam can be constructed by one of the following methods; 1) successively narrower strips of reclaimed composites, or 2) a plain beam finish cut to the desired profile. A U-Channel or C-Channel shaped beam can be constructed by one of the following methods; 1) layers of reclaimed fiber assembled to make one beam of the desired profile, 2) multiple plain composite beams assembled to form the desired profile, or 3) a plain beam finish cut to make the desired profile. Square tube channels can be an assembly of multiple plain beams.

Figure 14:
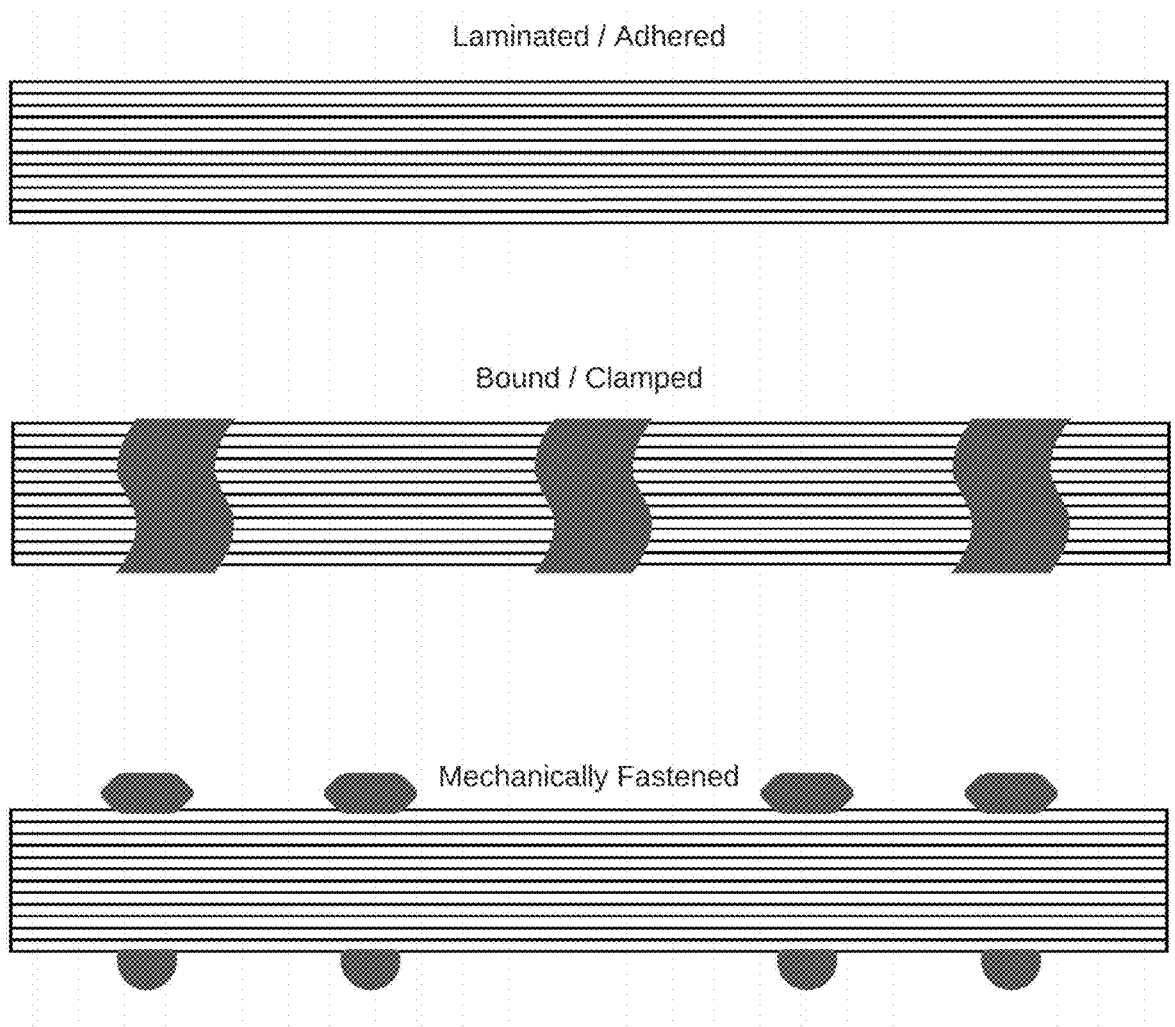
FIG. 14 illustrates simplified embodiments of common methods of forming beams from composite strips and joining beams to form custom profiles.

FIG. 14 illustrates example beam forming and joining methods. The basic laminated beam is constructed as shown by laminating or otherwise permanently joining multiple layers of fiber reinforced polymer composite using a glue or other adhesive between the layers to form a single beam. In some embodiments the layers which constitute the beam are bound using straps, clamps or otherwise by non-permanent means around the outside of the beam which allows adjustment and disassembly. In some embodiments the layers are mechanically fastened using one or more bolts, screws, rivets or other methods which bind the layers together through the beam. These methods of forming the basic beam profile can also be adapted for use with custom beam profiles illustrated in FIG. 14.

Figure 15:
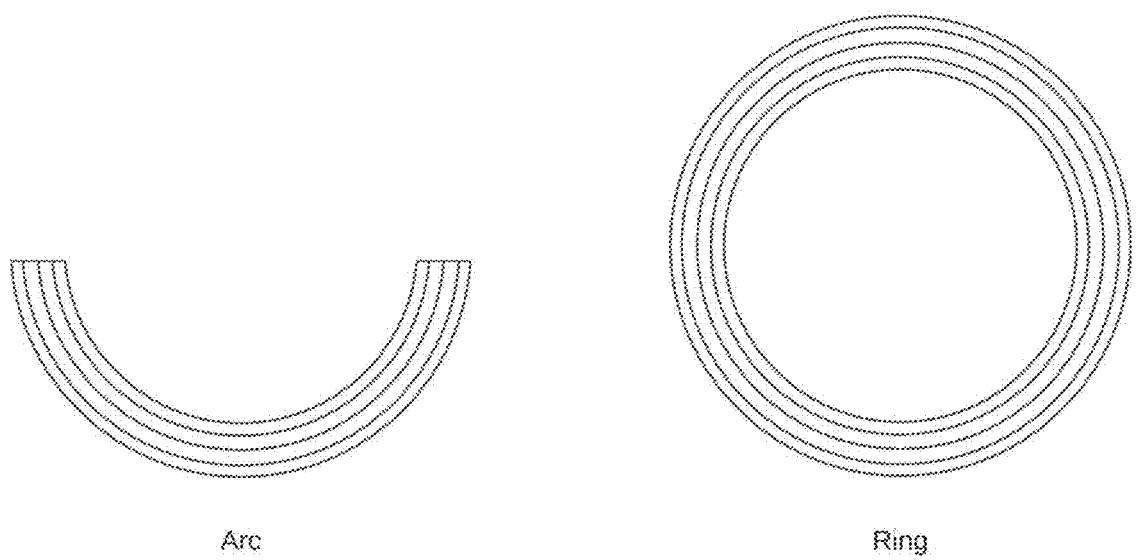
FIG. 15 illustrates a simplified embodiment of ring and non-linear beams.

FIG. 15 illustrates example ring and non-linear beams. The reclaimed fiber reinforced polymer composite strips of material are in most cases inherently flexible due to the relative thickness of the composite strip. Fixtures and clamps shown in FIG. 4 which are non-linear and/or non-planar can be utilized to form custom shapes. An arc beam can be formed by laminating layers in a curved fixture similar to the fixture and clamps shown in FIG. 4. A ring beam is a special type of beam which is circular and can be formed using reclaimed fiber reinforced polymer composite strips.

Figure 16:
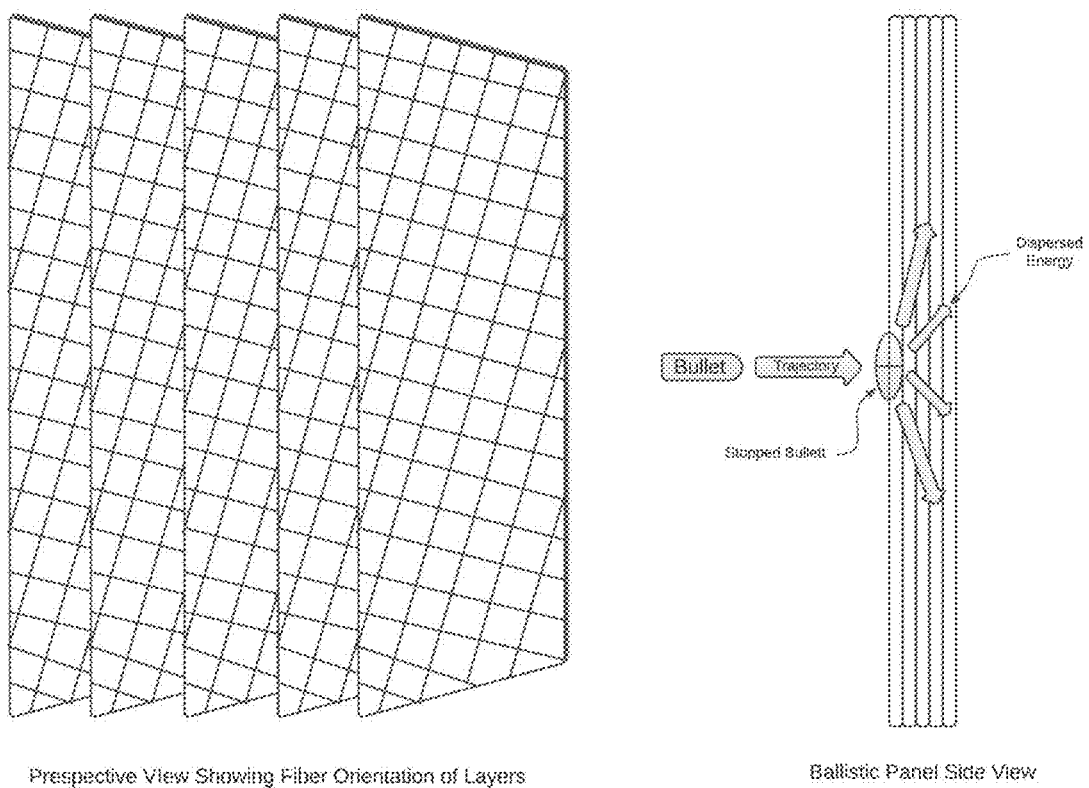
FIG. 16 illustrates a simplified view of a ballistic panel and representative impact.

FIG. 16 illustrates a ballistic panel with the layers of reclaimed fibre reinforced polymer composite strips shown at a perspective view with lines representing the bi-directional perpendicular fiber reinforcements of each layer. The lines are shown with large gaps for illustration purposes. In practice, the fibers are tightly packed in a woven or otherwise uniform distribution across the surface of the strip. The illustrated bullet is shown with trajectory to an impact point on the remanufactured composite panel for ballistic protection. The bullet is stopped at the surface of or within the panel by dissipating the bullet's energy through the panel and outward across the surface by the continuous and tightly packed fibers within the fiber reinforced polymer composite strips that constitute the composite panel. Various fiber orientations and configurations of layers can have different effects and performance characteristics of the resultant article.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of upcycling fiber reinforced polymer (FRP) material, comprising:
   disassembling a FRP source material into sections;
   planking the sections into longitudinal pieces;
   separating the longitudinal pieces into core material portions to make waste, and composite material portions to make composite strips;
   preparing the composite strips;
   remanufacturing the prepared composite strips into a resultant article, and
   wherein the remanufacturing step further comprises setup, layout, gluing, forming, and finishing.

2. The method of claim 1, wherein the FRP source material comprises glass fibers, polyaramid synthetic fibers such as Kevlar, carbon fibers, and combinations thereof.

3. The method of claim 1, wherein the FRP source material comprises a thermoset matrix further comprising a polymeric epoxy.

4. The method of claim 1, wherein the FRP source material comprises at least a portion of a wind turbine blade, a boat hull, a recreational vehicle, automotive components, commercial structures, industrial structures, and combinations thereof.

5. The method of claim 1, wherein the disassembling step further comprises cutting the FRP source material at predefined locations optimized to maximize length and minimize curvature of the planks.

6. The method of claim 1, wherein the separating step comprises mechanical separation, chemical separation, thermal separation, and combinations thereof.

7. The method of claim 1, wherein the separating step comprises cutting only the core material portions of the longitudinal pieces thereby retaining the composite material portions intact.

8. The method of claim 1, wherein the preparing step further comprises modifying the composite strips with tongue and groove joints, butt joints, scarf joints, and combinations thereof.

9. The method of claim 1, wherein the preparing step further comprises stripping, cleaning, inspecting, and sorting each composite strip.

10. The method of claim 9, wherein the stripping step further comprises removing excess materials and compounds attached to the FRP source material, wherein the excess materials comprise paint, glue, excess core material, metal, wood, and combinations thereof.

11. The method of claim 9, wherein the inspecting step further comprises manual inspection, automated inspection, visual inspection, x-ray inspection, and chemical penetration inspection of the composite strips for cracks and damage, and combinations thereof.

12. The method of claim 9, wherein the sorting step comprises classifying and co-locating similar composite strips based on fiber orientation, fiber density, thickness, condition, width, and combinations thereof.

13. The method of claim 1, wherein the forming step further comprises clamping alternating layers of composite strips and adhesive in a fixture configured to apply holding pressure to the resultant article.

14. The method of claim 13, wherein the adhesive comprises a resin.

15. The method of claim 1, wherein the resultant article retains the physical form and performance characteristics of the composite strips.

16. The method of claim 1, wherein the resultant article comprises structural beams, panels, walls, roofs, lattice structures, non-linear beams such as ring beams and arc beams, laminated composite strip beams, large beams comprising laminated or mechanically attached laminated beams, panels comprising laminated woven or crossed layers of composite strips, interlaced products comprising cut and assembled composite strips interlocked in a geometric pattern, formed laminated structures fixed and cured in a non-planar configuration, and combinations thereof.

17. A resultant article of upcycled fiber reinforced polymer (FRP) material, produced by the steps of:
disassembling a FRP source material into sections;
planking the sections into longitudinal pieces;
separating the longitudinal pieces into core material portions to make waste, and composite material portions to make composite strips;
preparing the composite strips;
remanufacturing the prepared composite strips into a resultant article, and
wherein the remanufacturing step further comprises setup, layout, gluing, forming, and finishing.

18. The resultant article of claim 17, wherein the FRP source material comprises at least a portion of a wind turbine blade, a boat hull, a recreational vehicle, automotive components, commercial structures, industrial structures, and combinations thereof.

19. The resultant article of claim 17, wherein the resultant article comprises structural beams, panels, walls, roofs, lattice structures, non-linear beams such as ring beams and arc beams, laminated composite strip beams, large beams comprising laminated or mechanically attached laminated beams, panels comprising laminated woven or crossed layers of composite strips, interlaced products comprising cut and assembled composite strips interlocked in a geometric pattern, formed laminated structures fixed and cured in a non-planar configuration, and combinations thereof.

20. A method of upcycling fiber reinforced polymer (FRP) material, comprising:
disassembling a FRP source material into sections;
planking the sections into longitudinal pieces;
separating the longitudinal pieces into core material portions to make waste, and composite material portions to make composite strips;
preparing the composite strips;
remanufacturing the prepared composite strips into a resultant article; and
wherein the fibers in the FRP source material remain in their native polymer composite matrix.

21. The method of claim 20, wherein the FRP source material comprises glass fibers, polyaramid synthetic fibers such as Kevlar, carbon fibers, a thermoset matrix further comprising a polymeric epoxy, at least a portion of a wind turbine blade, a boat hull, a recreational vehicle, automotive components, commercial structures, industrial structures, and combinations thereof.

22. The method of claim 20, wherein the disassembling step further comprises cutting the FRP source material at predefined locations optimized to maximize length and minimize curvature of the planks.

23. The method of claim 20, wherein the separating step comprises mechanical separation, chemical separation, thermal separation, cutting only the core material portions of the longitudinal pieces thereby retaining the composite material portions intact, and combinations thereof.

24. The method of claim 20, wherein the preparing step further comprises modifying the composite strips with tongue and groove joints, butt joints, scarf joints, and stripping, cleaning, inspecting, sorting each composite strip, and combinations thereof.

25. The method of claim 24, wherein the stripping step further comprises removing excess materials and compounds attached to the FRP source material, wherein the excess materials comprise paint, glue, excess core material, metal, wood, and combinations thereof.

26. The method of claim 24, wherein the inspecting step further comprises manual inspection, automated inspection, visual inspection, x-ray inspection, and chemical penetration inspection of the composite strips for cracks and damage, and combinations thereof.

27. The method of claim 24, wherein the sorting step comprises classifying and co-locating similar composite strips based on fiber orientation, fiber density, thickness, condition, width, and combinations thereof.

28. The method of claim 20, wherein the remanufacturing step further comprises setup, layout, gluing, forming, and finishing.

29. The method of claim 28, wherein the forming step further comprises clamping alternating layers of composite strips and adhesive in a fixture configured to apply holding pressure to the resultant article.

30. The method of claim 20, wherein the resultant article retains the physical form and performance characteristics of the composite strips.

31. The method of claim 20, wherein the resultant article comprises structural beams, panels, walls, roofs, lattice structures, non-linear beams such as ring beams and arc beams, laminated composite strip beams, large beams comprising laminated or mechanically attached laminated beams, panels comprising laminated woven or crossed layers of composite strips, interlaced products comprising cut and assembled composite strips interlocked in a geometric pattern, formed laminated structures fixed and cured in a non-planar configuration, and combinations thereof.

* * * * *